73-192 SE
4/14/87 YR RE 32,397

United States Patent [19]
Self et al.

[11] E Patent Number: Re. 32,397
[45] Reissued Date of Patent: Apr. 14, 1987

[54] GOLF CLUB SWING TRAINING AID

[75] Inventors: James M. Self; Charles Schaubel, both of Metairie, La.

[73] Assignee: Golfbands Products, New Orleans, La.

[21] Appl. No.: 512,139

[22] Filed: Jul. 8, 1983

Related U.S. Patent Documents

Reissue of:
[64] Patent No.: 4,353,556
Issued: Oct. 12, 1982
Appl. No.: 228,734
Filed: Jan. 27, 1981

[51] Int. Cl.[4] ..... A63B 69/36
[52] U.S. Cl. ..... 273/186 A; 273/191 B; 273/186 C; 273/192; 206/315.2
[58] Field of Search ..... 273/191 R, 191 B, 190 B, 273/192, 186 A, 186 R, 186 C, 26 B, 29 A; 124/17, 20; 272/135, 136, 137, 138, 142

[56] References Cited

U.S. PATENT DOCUMENTS

| | | | |
|---|---|---|---|
| 688,499 | 12/1901 | Bell | 272/136 |
| 704,840 | 7/1902 | Korth et al. | 272/136 |
| 2,655,378 | 10/1953 | Sheffer | 273/191 B |
| 2,858,133 | 10/1958 | Self | 273/192 X |
| 3,618,942 | 11/1971 | Bates | 273/26 B X |
| 3,912,266 | 10/1975 | Gury | 272/142 |
| 4,353,556 | 10/1982 | Self et al. | 273/192 |

FOREIGN PATENT DOCUMENTS

| | | | |
|---|---|---|---|
| 409167 | 4/1910 | France | 272/136 |
| 80528 | 4/1963 | France | 124/20 R X |

*Primary Examiner*—George J. Marlo
*Attorney, Agent, or Firm*—Schwartz, Jeffery, Schwaab, Mack, Blumenthal & Evans

[57] ABSTRACT

A golf training aid comprising an alignment band which is attached to a pair of spaced apart mounting points to establish a straight baseline, a first tension member one end of which is attached to one of the mounting points and a second tension member one end of which is attached to the other of the mounting points, the other ends of the tension members being secured to the head of a golf club; the tension members urging the head of the golf club into alignment with the baseline established by the alignment band to enable a golfer to practice the proper movement of various golf strokes against tension while discerning and maintaining the alignment of the selected hitting area of the head of his club with the desired path of movement. The mounting points may be defined by mounting bases provided with a top recess for receiving a chair leg and/or with an aperture through the bottom through which a peg may be extended into the ground. The mounting bases may screw together to form a container for the device when not in use. Bands with different elastic moduli may be used as the first and second tension members.

29 Claims, 4 Drawing Figures

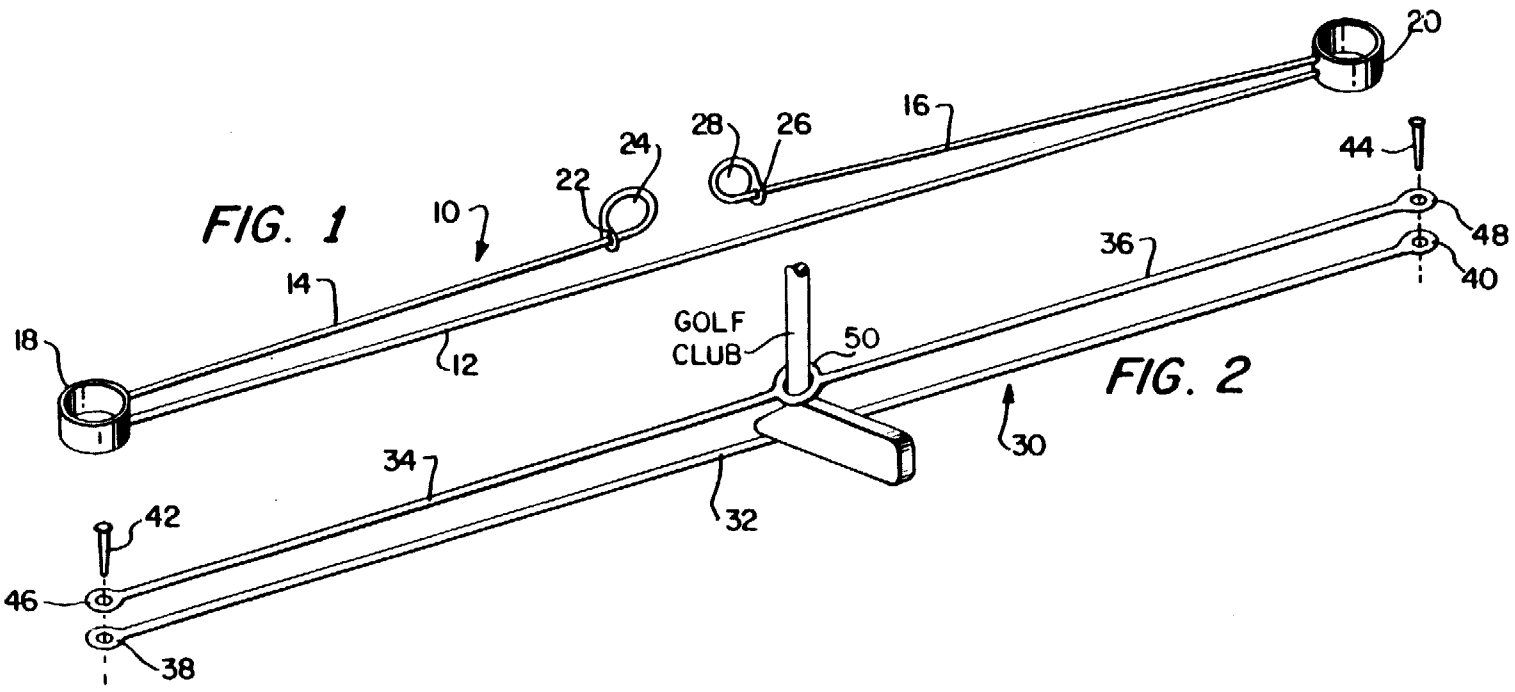
FIG. 1
FIG. 2
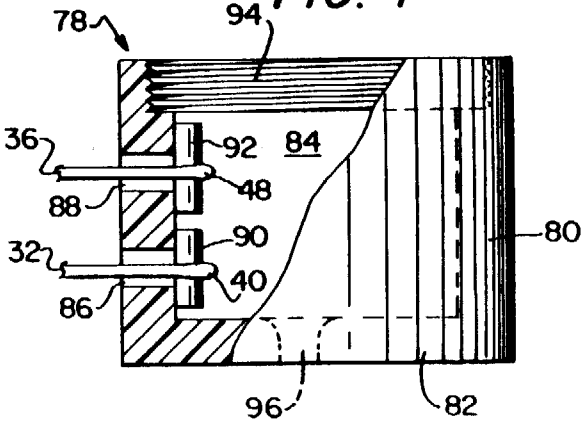
FIG. 4
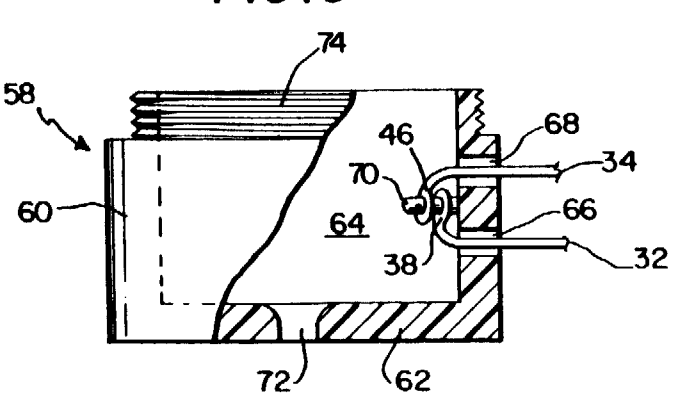
FIG. 3

GOLF CLUB SWING TRAINING AID

Matter enclosed in heavy brackets [ ] appears in the original patent but forms no part of this reissue specification; matter printed in italics indicates the additions made by reissue.

BACKGROUND OF THE INVENTION

This invention relates to golf training aids. More particularly, this invention relates to an apparatus for enabling a golfer to practice and improve his golf stroke.

Various training aids have been developed to enable golfers to practice their golf strokes. Such devices have not been entirely satisfactory because they do not enable the golfer to readily discern and maintain the desired alignment of the head of his club, or they do not facilitate development of proper strokes, or their use tends to promote undesirable movements such as excessive wrist action, or they are cumbersome and difficult to transport and use, or they are not readily adapted for use in various indoor or outdoor locations, or for numerous other reasons. There remains a need for development of a more satisfactory golf training aid.

SUMMARY OF THE INVENTION

Accordingly, it is an object of the present invention to provide a new golf training aid.

Another object of the present invention is to provide a golf training aid which will enable a golfer to practice and develop a proper stroke.

A further object of the present invention is to provide a golf training aid which facilitates development of a straight putting stroke.

It is also an object of the present invention to provide a golf training aid which enables a golfer to discern and maintain alignment of the head of his club with a desired path.

An additional object of the present invention is to provide a golf training aid with which a golfer may practice his stroke against controlled tension while maintaining proper alignment of the stroke.

Yet another object of the present invention is to provide a golf training aid which enables a golfer to practice his stroke against variable tension while maintaining proper alignment of the stroke.

A still further object of the present invention is to provide a golf training aid which enables a golfer to selectively emphasize practice of his backstroke or his forward stroke and follow through.

Yet another object of the present invention is to provide a golf training aid which is conveniently portable.

It is also an object of the present invention to provide a golf training aid which is suitable for indoor or outdoor use.

A still further object of the present invention is to provide a golf training aid which minimizes undesirable movements such as excessive wrist action.

Another object of the present invention is to provide a golf training aid which promotes a desirable muscle memory action.

A still further object of the present invention is to provide a golf training aid which promotes desirable visual conditioning.

Another object of the present invention is to provide a golf training aid which is economical to produce and convenient to use.

It is also an object of the present invention to provide a golf training aid which promotes practice of a putting stroke close to and parallel with the putting surface.

Another object of the present invention is to provide a golf training aid which will enable golfers from beginners to accomplished professionals to improve their stroke.

A further object of the present invention is to provide a golf training aid which may be used with all types of golf clubs including irons, woods and putters.

It is also an object of the present invention to provide a golf training aid which guides a golfer to properly align his stroke so that the ball is contacted by the selected hitting area of the club.

An additional object of the present invention is to provide a golf training aid which may be used with various types of stances including the closed stance, the open stance and the square stance.

These and other objects of the invention are achieved by providing a golf training aid comprising alignment band means, means for attaching one end of the alignment band means to one of a pair of spaced apart mounting points and for attaching the other end of said alignment band means to the other mounting point to establish a straight baseline, a first tension member, means for securing one end of said first tension member to the head of a golf club, means for attaching the other end of said first tension member to one of said spaced apart mounting points, a second tension member, means for securing one end of said second tension member to said golf club head, and means for attaching the other end of said second tension member to the other of said spaced apart mounting points; said first and second tension members urging said golf club head into alignment with the baseline established by said alignment band means.

In preferred embodiments of the present invention the alignment band means and the first and second tension members are elastic bands, the mounting points are established by a pair of cup-shaped mounting bases and the first and second tension members have different weights or elastic moduli.

BRIEF DESCRIPTION OF THE DRAWINGS

Further details of the invention will be apparent from a consideration of the accompanying drawings wherein FIG. 1 is a perspective view of one embodiment of the golf training aid of the invention;

FIG. 2 is a perspective view of an alternate embodiment of the golf training aid of the present invention;

FIG. 3 is a side elevation in partial section of one embodiment of a mounting base for use with the apparatus of the invention; and FIG. 4 is a side elevation in partial section of an alternate embodiment of a mounting base for use with the present invention.

DETAILED DESCRIPTION OF THE PREFERRED EMBODIMENTS

FIG. 1 is a perspective view of one preferred embodiment of golf training apparatus according to the present invention. The apparatus is generally designated by reference numeral 10 and comprises an alignment band 12 and first and second tension members 14 and 16, respectively. The opposite ends of alignment band 12 are respectively attached to cup-shaped mounting bases 18 and 20, respectively. Bases 18 and 20 are disposed in a spaced apart relation to define mounting points between which the alignment band extends to establish a straight baseline. Desirably, alignment band 12 may be made of an elastic material such as natural or synthetic rubber. Alignment band 12 may also comprise a stretchable band of woven elastic fibers. By disposing mounting bases 18 and 20 in positions somewhat farther apart than the relaxed length of alignment band 12, band 12 is placed under tension to assure that the baseline defined thereby will be as straight as possible. Mounting bases 18 and 20 are designed to be held in place for indoor use by placing the leg of a relatively stable piece of furniture, such as a chair, in each cup. For outdoor use, the bottom of each cup may be provided with an aperture through which a small peg may be extended into the ground to hold the mounting base in position.

Also secured to mounting base 18 is one end of a first tension member 14. The other end of tension member 14 is doubled back and fastened around itself at 22 to form an adjustable loop 24. Similarly, one end of second tension member 16 is attached to mounting base 20. The other end of tension member 16 is doubled back and passed around itself at 26 to form a second adjustable loop 28. Loops 24 and 28 are designed to be positioned around the head of a golf club. Desirably, the loops are passed around the head of the club such that tension members 14 and 16 are both aligned with the selected hitting area of the head of the club.

First and second tension members 14 and 16 may also be formed of an elastomeric material such as natural or synthetic rubber or a woven cord of elastic fibers. Alternatively, flexible coil springs or other equivalent devices could be used as the tension members. The length of tension members 14 and 16 is such that when the mounting bases 18 and 20 are disposed in the desired spaced apart position and loops 24 and 28 are secured around the head of a golf club, both member 14 and member 16 will be under tension. The head of the club will thus be urged to assume a position just above and in alignment with alignment band 12. The head of the club will also be drawn to a position between the securing bases 18 and 20 where the tensile forces exerted by members 14 and 16 will be balanced.

Desirably, one of said first and second tension members may be heavier then the other; that is to say, the tension members have different elastic moduli, so that it will require a greater force to stretch one of the tension members through a given distance than would be required to stretch the other tension member the same distance. By appropriately positioning the heavier tension member toward the front or the rear of the stroke, a golfer may selectively emphasize improvement of his backstroke or his forward stroke and follow through in his training.

In use, mounting bases 18 and 20 are spaced apart a desired distance and held in the desired position by inserting the leg of a chair or other relatively stable piece of furniture into the cup of each mounting base. The spacing of the mounting bases is chosen to place alignment band 12 under tension so that the band will define a straight baseline. Loops 24 and 28 are secured around the head of a golf club. The spacing between mounting bases 18 and 20 is also greater than the combined relaxed lengths of tension members 14 and 16, so that when the tension members are both secured around the head of the golf club, both members are under tension. The force exerted by the tension members draws and hold the head of the club in alignment with the baseline defined by alignment band 12.

A golfer then assumes a stance adjacent alignment band 12 and works the club to move the head thereof back and forth along the baseline against the tension provided by tension members 14 and 16. Practice of a straight putting stroke is fostered by the tensile forces of the opposed tension members. By working against the tension supplied by bands 14 and 16, erratic movements are suppressed and a smooth stroke is promoted. Factors which can cause a crooked stroke or a twisting motion such as a misaligned stance or excessive wrist action, are readily detectable by observing the movement of the head of the club in relation to alignment band 12. In practicing putting strokes, the tension supplied by bands 14 and 16 also encourages keeping the putter close to the putting surface, as is desirable in a good putting stroke.

The advantages of the golf training aid of the present invention are by no means limited to use with a putter to practice a putting stroke. The invention may advantageously be used by a golfer with all types of clubs, including woods and irons, to practice and improve all types of strokes. In all cases, the opposed tension members act on the club to urge the club into alignment with the desired path of movement and to reduce or prevent entirely any erratic motions. In all cases practice with the device develops a "muscle memory" of the desired movements. Furthermore, working against tension helps a golfer to develop a stronger release and more consistent follow through on drives and other distance strokes while at the same time maintaining the alignment of the selected hitting area of the club with the desired path of movement.

Most golfers, are hindered by bad habits which they have developed. Often, when a golfer with a habitually poor stroke is shown how to make a proper stroke, the proper movements feel unnatural to him. In many cases the proper movements are quickly abandoned and the golfer goes back to his old habits as soon as he is out of the eye of his coach, and the golfer usually does not even realize what he has done. The golf training aid of the invention which urges the head of the golf club into alignment with the desired path of motion of the selected hitting area, smooths out erratic motions and requires extra concentration and effort to work against the tension provided by the tension members, prevents the golfer from slipping back into his old bad habits and enables the golfer, whether an amateur or an accomplished professional, to practice a proper stroke until the movements all feel natural to him.

Repeated exercise with the apparatus of the invention conditions a golfer to make a proper stroke with his entire body while simultaneously maintaining the desired alignment of the selected hitting area on the head of his club with the desired path of his stroke. Also, by working against slightly greater tension in one direction, the phenomenon of muscle memory may be further utilized to achieve increased conditioning. This phenomenon is based on the fact that after repeated exercise in moving the head of a golf club along a desired path against tension, the muscles utilized to make the desired movement become accustomed to working against the increased resistance supplied by the tension members. When the tension members are thereafter disconnected and the same movements are effected to cause the head of the club to traverse the desired path, the muscles do not encounter the accustomed resistance. The result is a temporary illusion which makes it seem to the golfer as though the head of the club were being drawn along the desired path by some invisible magnetic force. After a suitable period of conditioning and practice, the muscles "memorize" the desired movements which then become virtually automatic, and conscious effort is required to cause the head of the club to deviate from the desired path.

If desired, one of the mounting bases may be designed to visually simulate the hole in a golf green so that repeated practice with the apparatus of the invention achieves both visual and physical conditioning.

In use the mounting bases desirably will be spaced apart a distance from about 4 to 10 feet. The alignment band may comprise an elastic band having a relaxed length shorter than the desired spacing between the mounting points defined by the spaced apart mounting bases which is stretched to a length corresponding to the desired spacing as the mounting bases are positioned for use. The tension of the stretched band will assure that a straight baseline will be established by the alignment band. Desirably the tension of the stretched band will range between about 0.2 and 2 pounds of force, preferably about 0.5 to 1 pounds of force. It is not essential, however, that alignment band 12 comprises an elastic band. Instead, a tightly stretched substantially inelastic band having a length corresponding to the desired spacing between mounting points could be utilized to establish the baseline. The use of an elastic member is preferred, however, in order to facilitate establishment of the straightest possible baseline.

It is also not essential that the length of the alignment band be substantially equal to the sum of the lengths of the first and second tension members. The alignment band could be either shorter or longer. It is only necessary that the lengths of the alignment band and the first and second tension members be such that when the mounting bases are spaced apart the desired distance, the alignment band establishes a straight baseline and the first and second tension members are both placed under tension when secured to the head of a golf club.

The first and second tension members advantageously are elastic bands having relaxed lengths from about 0.5 to about 3 feet, preferably between about 1 and about 2 feet. It is not essential that the first and second tension members have equal lengths, indeed it may be advantageous to use bands of different lengths. Desirably, the first and second tension members will have elastic moduli such that when the bands are stretched so that their combined length equals the desired spacing between the mounting points, the tension of the bands will range between about 0.3 and about 5 pounds of force, preferably between about 0.5 and about 2 pounds of force.

If the weights or elastic moduli of the first and second tension members are substantially equal, then the resistance provided by one of the members to motion of the head of a golf club along the baseline will be substantially offset by the other band, assuming the overall displacement is small in comparison to the length of the bands. Alignment of the head of the club along the desired path will be maintained by the tension members and a muscle memory of the desired movements will still be developed, but the temporary illusion of a magnetic force guiding the club will be reduced or eliminated.

If, on the other hand, one of the tension members is substantially heavier than the other, then displacement of the head of the golf club along the desired path in a direction away from the heavier member will require ever increasing amounts of force. The benefits of having opposed tension members which draw and hold the head of the golf club into alignment with the desired path defined by the baseline can be combined with the muscle conditioning advantages of working against tension. To emphasize improvement of the backstroke, the heavier band should be placed toward the forward part of the stroke so that drawing the club backward requires ever increasing amounts of force. Similarly, to emphasize improvement of the forward stroke and follow through, the heavier tension member should be placed toward the back of the stroke so that the forward movement of the club requires ever increasing amounts of force.

By way of example, a highly satisfactory device has been produced in which the alignment band is a 29 inch long rubber band which exerts 0.6 pounds of force when stretched to 55 inches. The first tension member of the example device is a 9.75 inch long rubber band having an elastic modulus such that is exerts a force of 0.75 pounds when extended to 15.25 inches, and the second tension member is a 17.5 inch long rubber band having an elastic modulus such that it exerts a force of 0.75 pounds when extended to 40 inches. In the example device, the extremities of the respective bands are designed to be secured to mounting points which are spaced apart a distance of from 4 to 5 feet, preferably about 4.5 feet.

Within limits, the tension of the bands may be adjusted by increasing or decreasing the distance between the spaced mounting points to which they are attached. Similarly, the relative tension exerted by one of the tension members compared to the other tension member may be adjusted within limits by simply moving the position which represents the bottom or center point of the stroke in a direction opposite that from which the increased force is desired. For example, to increase the relative tension against which a forward stroke is effected, a golfer need only move his starting position slightly forward along the baseline established by the alignment band. Optionally, a series of bands of different weights and strengths may be provided and substituted for each other in order to enable golf strokes to be practiced against varying degrees of resistance.

FIG. 2 is a perspective representation of another preferred embodiment of the golf training apparatus of the invention generally designated by reference numeral 30. Apparatus 30 comprises an alignment band 32 and first and second tension members 34 and 36, respectively. Alignment band 32 and tension members 34 and 36 are formed of elastomeric material so that they can be stretched and placed under tension. The ends of alignment band 32 are provided with loops 38 and 40, respectively, to enable the ends of the band to be attached to spaced apart mounting points when the device is in use. For outdoor use, the ends of the alignment band may be attached to mounting points established by driving small pegs, such as golf tees 42 and 44, into the ground. The outermost ends of first and second tension members 34 and 36 are respectively attached to the mounting points established by tees 42 and 44 by means of loops 46 and 48 formed at the extremities thereof. The inner ends of first and second tension members 34 and 36 are both attached to a tightly fitting elastic sleeve or loop 50 so that tension members 34 and 36 and loop 50 form a unitary, integral assembly. Loop 50 is designed to receive and securely hold the head of a golf club. As in the case of tension members 14 and 16, tension members 34 and 36 may be of equal or unequal weight. Most preferably, one of the tension members will be heavier than the other so that the beneficial effects of working against tension will be more readily achieved.

Other systems for securing the head of a club to tension members 34 and 36 may be substituted for loop 50. For example, the loop may be replaced by a sleeve or a sheath for receiving the head of a golf club. Such a sleeve or sheath may take the form of an elastic enclosure for the golf club head or it may be formed of substantially inelastic material and be secured around the head of the golf club by snaps, laces or other fasteners.

If desired, apparatus 30 may also be used indoors by passing the looped ends 38, 40, 46 and 48 around relatively immoveable, spaced apart mounting points such as chair legs, or specially installed hooks or clamps. Adjustable loops similar to loops 24 and 28 may be formed by doubling the ends of the alignment band and tension members back upon themselves with the band or tension member passing through loops 38, 40, 46 and 48.

The manner of using apparatus 30 is substantially the same as for apparatus 10.

FIG. 3 is a side elevation in partial section of one preferred embodiment of a mounting base 58. Mounting base 58 is formed as a generally cup-shaped member having an annular side wall 60 and a bottom wall 62 defining an interior cavity 64. The top of the cavity is generally open so that a relatively immoveable article, such as the leg of a chair, may be received therein to hold the mounting base in position and establish a fixed mounting point. A pair of apertures 66 and 68 are formed through the annular side wall of mounting base 58. The end of an alignment band, such as band 32, is passed through aperture 66 and loop 38 is placed around an internal pin 70 which projects from the inner surface of annular wall 60 in order to securely attach alignment band 32 to mounting base 58. Similarly, the end of tension member 34 is passed through aperture 68 and loop 46 is placed around pin 70 to attach tension member 34 to mounting base 58.

The bottom wall 62 of mounting base 58 is also provided with an aperture 72. This aperture enables mounting base 58 to be used outdoors and fixed in a given position by driving a small peg, such as a golf tee, through aperture 72 into the ground. It is then no longer necessary to place a chair leg or other similar article in interior cavity 64.

The top of the annular wall 60 is provided with a threaded portion 74 designed to engage mating threads formed on another mounting base so that the two mounting bases may be joined to each other in order to prevent separation or loss of one of the pieces when the apparatus is not in use. The assembled mounting bases form a convenient container for storage of the alignment band and tension members.

FIG. 4 depicts an alternate mounting base 78. Mounting base 78 is also formed as a substantially cup-shaped member having an annular side wall 80 and a bottom wall 82 defining a cavity 84 which is open at the top. A pair of apertures 86 and 88 are formed through side wall 80, and the ends of alignment band 32 and tension member 36, respectively, are received therethrough. A mounting pin 90 having a diameter smaller than and length greater than the diameter of aperture 86 is fixed in loop 40 of alignment band 32. By orienting pin 90 with its axis parallel to the axis of aperture 86, alignment band 32 may be inserted and/or withdrawn through aperture 86. When pin 90 is turned so that its axis is perpendicular to the axis of aperture 86, withdrawal of alignment band 32 is prevented by the engagement of pin 90 with the side wall 80 of mounting base 78. Loop 48 is similarly provided with a mounting pin 92 in order to enable tension member 36 to be releasably attached to mounting base 78. Mounting base 78 is also provided with a threaded portion 94 to enable the base to be joined with a mating base to form a container for the alignment band and tension members. Similarly, an aperture 96 is provided through bottom wall 82 to enable the position of the mounting base to be fixed outdoors by driving a small peg, such as a golf tee, therethrough into the ground.

The foregoing embodiments have been set forth merely as examples of the invention, and are not intended to be limiting. Since modifications of the disclosed embodiments incorporating the substance and spirit of the invention may occur to persons skilled in the art, the scope of the invention is to be limited solely by the scope of the appended claims.

We claim:

1. A golf training aid consisting of:

alignment band means;

means for attaching one end of said alignment band means to one of a pair of spaced apart mounting points and the other end of said alignment band means to the other of said mounting points to establish a straight baseline;

a first tension member;

means for securing one end of said first tension member to the head of a golf club;

means for attaching the other end of said first tension member to one of said spaced mounting points;

a second tension member;

means for securing one end of said second tension member to said golf club head;

means for attaching the other end of said second tension member to the other of said spaced mounting points; and said first and second tension members urging said golf club head into alignment with the baseline established by said alignment band means.

2. A golf training aid comprising:

alignment band means;

means for attaching one end of said alignment band means to one of a pair of spaced apart mounting points and the other end of said alignment band means to the other of said mounting points to establish a straight baseline;

a first tension member;

means for securing one end of said first tension member to the head of a golf club;

means for attaching the other end of said first tension member to one of said spaced mounting points;

a second tension member;

means for securing one end of said second tension member to said golf club head;

means for attaching the other end of said second tension member to the other of said spaced mounting points;

said first and second tension members urging said golf club head into alignment with a baseline established by said alignment band means; and said alignment band means being free from protuberances which would interfere with a proper stroke of a golf club when the head of such club is secured to said tension members.

3. A golf training aid comprising:

alignment band means;

means for attaching one end of said alignment band means to one of a pair of spaced apart mounting points and the other end of said alignment band means to the other of said mounting points to establish a straight baseline;

a first tension member;

means for securing one end of said first tension member to the head of a golf club;

means for attaching the other end of said first tension member to one of said spaced mounting points;

a second tension member;

means for securing one end of said second tension member to said golf club head;

means for attaching the other end of said second tension member to the other of said spaced mounting points;

said first and second tension members urging said g-lf club head into alignment with a baseline established by said alignment band means, and said means for securing said tension members to a golf club head comprising an open loop adapted to receive the head of a golf club therethrough.

4. A golf training aid comprising:

alignment band means;

means for attaching one end of said alignment band means to one of a pair of spaced apart mounting points and the other end of said alignment band means to the other of said mounting points to establish a straight baseline;

a first tension member;

means for securing one end of said first tension member to the head of a golf club;

means for attaching the other end of said first tension member to one of said spaced mounting points;

a second tension member;

means for securing one end of said second tension member to said golf club head;

means for attaching the other end of said second tension member to the other of said spaced mounting points;

said first and second tension members urging said golf club head into alignment with a baseline established by said alignment band means, and said first and second tension members having different elastic moduli.

5. Apparatus according to claim 1, 2, 3 or 4 wherein said alignment band means comprises an elastic band.

6. Apparatus according to claim 1, 2, 3 or 4 further comprising a pair of mounting bases for establishing said mounting points.

7. Apparatus according to claim 6, wherein each mounting base is provided with an aperture through the bottom wall thereof through which a peg may be inserted into the ground to fix the position of the mounting base.

8. Apparatus according to claim 6, wherein said mounting bases may be joined to each other when the apparatus is not in use and form a container when joined in which the alignment band means and said first and second tension members may be stored.

9. Apparatus according to claim 6 wherein each mounting base is provided with a recess in the top thereof adapted to receive a chair leg to fix the position of the mounting base.

10. Apparatus according to claim 1, 2, 3 or 4 wherein said tension members comprise bands of natural or synthetic rubber.

11. Apparatus according to claim 1, 2 or 4 wherein said means for securing the tension members to said gold club head comprise means for forming adjustable loops which may be placed around said golf club head.

12. Apparatus according to claim 1, 2 or 4 wherein said attaching means comprise loops formed in the ends of said alignment band and tension members.

13. Apparatus according to claim 1, 2, 3 or 4 wherein the sum of the lengths of said first and second tension members is substantially equal to the length of said alignment band means.

14. Apparatus according to claim 1, 2, 3 or 4 wherein said first and second tension members are joined to each other to form a unitary, integral article.

15. Apparatus according to claim 1, 2, 3 or 4 wherein said first and second tension members are adapted to be secured to said golf club head in alignment with a selected hitting area on said golf club head.

*16. An athletic training aid consisting of:*

*an athletic implement for hitting game balls;*

*alignment band means;*

*means for attaching one end of said alignment band means to one of a pair of spaced apart mounting points and the other end of said alignment band means to the other of said mounting points to establish a straight baseline;*

*a first tension member;*

*means for securing one end of said first tension member to said implement;*

*means for attaching the other end of said first tension member to one of said spaced mounting points;*

*a second tension member;*

*means for securing one end of said second tension member to said implement;*

*means for attaching the other end of said second tension member to the other of said spaced mounting points; and*

*said first and second tension members urging said implement into alignment with the baseline established by said alignment band means during an athletic maneuver.*

*17. An athletic training aid comprising:*

*an athletic implement for hitting game balls;*

*alignment band means;*

*means for attaching one end of said alignment band means to one of a pair of spaced apart mounting points and the other end of said alignment band means to the other of said mounting points to establish a straight baseline;*

*a first tension member;*

*means for securing one end of said first tension member to said implement;*

*means for attaching the other end of said first tension member to one of said spaced mounting points;*

*a second tension member;*

*means for securing one end of said second tension member to said implement;*

*means for attaching the other end of said second tension member to the other of said spaced mounting points;*

*said first and second tension members urging said implement into alignment with a baseline established by said alignment band means during an athletic maneuver; and*

*said alignment band means being free from protuberances which would interfere with a proper movement of said implement when said implement is secured to said tension members.*

*18. An athletic training aid comprising:*

*an athletic implement for hitting game balls;*

*alignment band means;*

*means for attaching one end of said alignment band means to one of a pair of spaced apart mounting points and the other end of said alignment band means to the other of said mounting points to establish a straight baseline;*

*a first tension member;*

*means for securing one end of said first tension member to said implement;*

*means for attaching the other end of said first tension member to one of said spaced mounting points;*

*a second tension member;*

*means for securing one end of said second tension member to said implement;*

*means for attaching the other end of said second tension member to the other of said spaced mounting points;*

*said first and second tension members urging said implement into alignment with a baseline established by said alignment band means during an athletic maneuver; and*

*said means for securing said tension members to said implement comprising an open loop adapted to receive the implement.*

*19. An athletic training aid comprising:*

*an athletic implement for hitting game balls;*

*alignment band means;*

*means for attaching one end of said alignment band means to one of a pair of spaced apart mounting points and the other end of said alignment band means to the other of said mounting points to establish a straight baseline;*

*a first tension member;*

*means for securing one end of said first tension member to said implement;*

*means for attaching the other end of said first tension member to one of said spaced mounting points;*

*a second tension member;*

*means for securing one end of said second tension member to said implement;*

*means for attaching the other end of said second tension member to the other of said spaced mounting points;*

*said first and second tension members urging said implement into alignment with a baseline established by said alignment band means during an athletic maneuver; and*

*said first and second tension members having different elastic moduli.*

*20. Apparatus according to claim 16, 17, 18 or 19, wherein said alignment band means comprises an elastic band.*

*21. Apparatus according to claim 16, 17, 18 or 19 further comprising a pair of mounting bases for establishing said mounting points.*

*22. Apparatus according to claim 21, wherein each mounting base is provided with an aperture through the bottom wall thereof through which a peg may be inserted into the ground to fix the position of the mounting base.*

*23. Apparatus according to claim 21, wherein said mounting bases may be joined to each other when the apparatus is not in use and form a container when joined in which the alignment band means and said first and second tension members may be stored.*

*24. Apparatus according to claim 21, wherein each mounting base is provided with a recess in the top thereof adapted to receive a chair leg to fix the position of the mounting base.*

*25. Apparatus according to claim 16, 17, 18 or 19, wherein said tension members comprise bands of natural or synthetic rubber.*

*26. Apparatus according to claim 16, 17, 18 or 19, wherein said means for securing the tension members to said element comprise means for forming adjustable loops which may be placed around said implement.*

*27. Apparatus according to claim 16, 17, 18 or 19, wherein said attaching means comprise loops formed in the ends of said alignment band and tension members.*

*28. Apparatus according to claim 16, 17, 18 or 19, wherein the sum of lengths of said first and second tension members is substantially equal to the length of said alignment band means.*

*29. Apparatus according to claim 16, 17, 18 or 19, wherein said first and second tension members are joined to each other to form a unitary, integral article.*

* * * * *